US00RE45157E

(19) United States
(12) Reissued Patent
Mathurin

(10) Patent Number: US RE45,157 E
(45) Date of Reissued Patent: Sep. 23, 2014

(54) VOICE ACTIVATED PORTABLE AUDIO/VIDEO REQUEST, PLAY AND RECORD SYSTEM

(76) Inventor: Trevor R. Mathurin, San Ramon, CA (US)

(21) Appl. No.: 11/850,836

(22) Filed: Sep. 6, 2007

Related U.S. Patent Documents

Reissue of:
(64) Patent No.: 6,941,181
Issued: Sep. 6, 2005
Appl. No.: 09/585,797
Filed: Jun. 3, 2000

(51) Int. Cl.
*G06F 17/00* (2006.01)

(52) U.S. Cl.
USPC ..... 700/94; 455/344; 348/839; 348/838; 348/844; 361/683; 361/686; 361/679

(58) Field of Classification Search
USPC ..... 700/94; 84/517–518; 340/825.24, 340/825.25; 381/77, 79
See application file for complete search history.

(56) References Cited

U.S. PATENT DOCUMENTS

| | | | | |
|---|---|---|---|---|
| 4,700,377 | A | 10/1987 | Yasuda et al. | |
| 4,721,954 | A * | 1/1988 | Mauch | 340/5.54 |
| 4,797,924 | A | 1/1989 | Schnars et al. | |
| 5,345,538 | A | 9/1994 | Narayannan et al. | |
| D358,593 | S | 5/1995 | Oba | |
| D400,531 | S | 11/1998 | Kokkinis | |
| D408,412 | S | 4/1999 | Zeitman | |
| 5,991,637 | A | 11/1999 | Mack, II et al. | |
| 6,031,795 | A * | 2/2000 | Wehmeyer | 369/30.28 |
| 6,043,976 | A * | 3/2000 | Su | 361/679.41 |
| 6,175,356 | B1 * | 1/2001 | Jung | 345/158 |
| 6,396,531 | B1 * | 5/2002 | Gerszberg et al. | 348/14.01 |
| 6,542,870 | B1 * | 4/2003 | Matsumoto | 705/51 |
| 6,606,381 | B1 * | 8/2003 | Wunsch | 379/356.01 |
| 6,621,938 | B1 * | 9/2003 | Tanaka et al. | 382/276 |
| 6,654,721 | B2 * | 11/2003 | Handelman | 704/270 |
| 2001/0055978 | A1 * | 12/2001 | Herrod et al. | 455/517 |

FOREIGN PATENT DOCUMENTS

| | | | | |
|---|---|---|---|---|
| GB | 2298552 A * | 9/1996 | | H04M 1/72 |

* cited by examiner

*Primary Examiner* — Disler Paul
(74) *Attorney, Agent, or Firm* — Meister Seelig & Fein LLP

(57) ABSTRACT

An audio/video control device for providing audio and/or video signals to a user. The audio/video control device includes a base unit and a portable unit. The base unit includes a housing having a recess extending therein and a first processor for controlling operation of the base unit. A first audio/video storage and reproduction device is positioned within the housing and controlled by the processor to store and reproduce audio and video signals. A device for connection with an external source of audio and video signals is also connected to the first processor. The processor is able to receive control commands for operating the device through a microphone. The portable unit is releasably connected within the recess of the base unit either jointly or separably. The portable unit includes a second processor and a connector for selectively connecting the second processor to the first processor. A touch screen display is connected to the second processor for displaying a menu of operation selections and providing manual control signals to the second processor for controlling operation of the device upon contact of one of the displayed menu operation selections. A device for reproducing and storing audio and video signals on a storage medium as well as a second audio/video storage and reproduction device positioned and a second device for connection with an external source of audio and video signals are connected to the second processor. A user is able to operate the device using either audible and manual control signals.

99 Claims, 7 Drawing Sheets

VOICE ACTIVATED PORTABLE AUDIO/VIDEO REQUEST, PLAY AND RECORD SYSTEM

Matter enclosed in heavy brackets [ ] appears in the original patent but forms no part of this reissue specification; matter printed in italics indicates the additions made by reissue.

*Application Ser. No. 11/850,836 is a reissue of application Ser. No. 09/585,797.*

BACKGROUND OF THE INVENTION

1. Field of the Invention

The present invention relates generally to audio/video devices and, more specifically, to a voice activated device able to control the playing, recording and receiving of audio and video sources upon receipt of an audible or manually input command signal, the device having a detachable portable section able to replay audio and video recorded thereby.

2. Description of the Prior Art

Numerous types of audio/video control devices have been provided in the prior art. For example, U.S. Pat. Nos. 4,700,377; 4,797,924; 5,345,538; 5,991,637; Des. 358,593; Des. 400,531 and Des. 408,412 all are illustrative of such prior art. While these units may be suitable for the particular purpose to which they address, they would not be as suitable for the purposes of the present invention as heretofore described.

U.S. Pat. No. 4,700,377

Inventor: Hiroshi Yasuda et al.

Issued: Oct. 13, 1987

An electronic apparatus includes a plurality of selectively actuable selection devices for causing the apparatus to perform a plurality of distinct operations. A first actuation of a selection device establishes a first condition to cause the apparatus to generate an externally detectable identification such as by voice synthesis of the selected operation, and a second actuation of the selection device establishes a second condition to cause the apparatus to perform the selected operation and identify the operation on a display. In a preferred embodiment, the selection devices are each a push button actuable from a rest position to a first depressed position to establish the first condition by actuating a first switch, and thereafter actuable from the first depressed position to a second depressed position to establish the second condition by actuating a second switch.

U.S. Pat. No. 4,797,924

Inventor: Michael J. Schnars et al.

Issued: Jan. 10, 1989

A voice actuated control system for a motor vehicle. A microphone mounted to the vehicle senses user commands as well as other noise in the passenger compartment. Analog electrical signals from the microphone are converted into digital form and compared by a high speed microprocessor with a user profile. A correspondence between the profile and the sensed input causes a control function such as raising or lowering a window to be performed. A speech synthesizer in the system prompts the user in the event a command in a command sequence is inappropriate.

U.S. Pat. No. 5,345,538

Inventor: Krishna Narayannan et al.

Issued: Sep. 6, 1994

A system is provided with a voice activated control apparatus which permits precise control of one or more system variables by means of voice commands uttered by the system operator. When a system variable is in a movement or change mode, the movement or change is terminated by any sound exceeding a pre-established acoustic threshold level. Any value of one or more system variables can be identified and appropriate data stored in a memory to permit the one or more system variables to return to an identified value or state with a single voice command. The control apparatus is combined with a screen monitor and/or an acoustic speaker to provide visible and/or acoustic responses to an operator. The control apparatus is practical for retrofitting existing remotely controllable systems.

U.S. Pat. No. 5,991,637

Inventor: Gawins A. Mack II et al.

Issued: Nov. 23, 1999

A combined entertainment and communications system includes a passive communications subsystem such as an Am/FM radio receiver, an active communications subsystem such as a cellular telephone transmitter/receiver or a CB radio transmitter/receiver, and a shared I/O subsystem. The subsystems are integrated into a single portable package and are controlled by a control mechanism capable of automatically or semi-automatically switching control of the shared I/O subsystem between the active and passive communications subsystems. Size and weight of the device are reduced by sharing common input/output (I/O) and control components. Optional voice recognition equipment can be used to control the active or passive communications subsystems. Alternative embodiments provide additional functions such as voice activation, remote monitoring, radio station scanning for preselected audio works, caller ID used in conjunction with voice synthesis, folding headsets, and modular function packaging to easily expand or alter a particular system. Voice recognition can also be used in a passive only version of the system.

U.S. Pat. No. Des. 358,593

Inventor: Haruo Oba

Issued: May 23, 1995

An ornamental design for a combined CD player, radio and cassette recorder is disclosed by this design patent.

U.S. Pat. No. Des. 400,531

Inventor: Serge Kokkinis

Issued: Nov. 3, 1998

An ornamental design for a combined CD player and radio system is disclosed by this design patent.

U.S. Pat. No. Des. 408,412

Inventor: Josh Zeitman

Issued: Apr. 20, 1999

An ornamental design for a combined radio, cassette and CD player is disclosed by this design patent.

SUMMARY OF THE PRESENT INVENTION

The present invention relates generally to audio/video devices and, more specifically, to a voice activated device able to control the playing, recording and receiving of audio and video sources upon receipt of an audible or manually input command signal, the device having a detachable portable section able to replay audio and video recorded thereby.

A primary object of the present invention is to provide an audio/video control device that will overcome the shortcomings of prior art devices.

Another object of the present invention is to provide an audio/video control device which is able to receive audio command signals for controlling operation thereof.

A further object of the present invention is to provide an audio/video control device which is able to receive manually input control signals through a touch screen for controlling operation thereof.

A yet further object of the present invention is to provide an audio/video control device including a portable section removably connected to a main base unit, the base unit being able to store data on a memory card for reproduction by the portable section.

A still further object of the present invention is to provide an audio/video control device including a read/write CD ROM drive, a video screen and control buttons for operating these devices, wherein the video screen is a touch screen though which a user is able to input control commands and is able to display video images such as a movie and interactive video games for entertaining a user.

Another object of the present invention is to provide an audio/video control device including a microphone through which audible control commands are input to the device.

Another object of the present invention is to provide an audio/video control device including a speaker for providing audible interactive commands for a user to aid in operation of the device.

A still further object of the present invention is to provide an audio/video control device including a cellular transmitter/receiver for connecting with a central station for wireless reception of audio and video signals.

An even further object of the present invention is to provide an audio/video control device including connection ports for telephone and cable lines providing alternate sources of audio and video signals.

A yet further object of the present invention is to provide an audio/video control device that is simple and easy to use.

A still further object of the present invention is to provide an audio/video control device that is economical in cost to manufacture.

Additional objects of the present invention will appear as the description proceeds.

An audio/video control device for providing audio and/or video signals to a user. The audio/video control device includes a base unit and a portable unit. The base unit includes a housing having a recess extending therein and a first processor for controlling operation of the base unit. A first audio/video storage and reproduction device is positioned within the housing and controlled by the processor to store and reproduce audio and video signals. A device for connection with an external source of audio and video signals is also connected to the first processor. The processor is able to receive control commands for operating the device through a microphone. The portable unit is releasably connected within the recess of the base unit either jointly or separably. The portable unit includes a second processor and a connector for selectively connecting the second processor to the first processor. A touch screen display is connected to the second processor for displaying a menu of operation selections and providing manual control signals to the second processor for controlling operation of the device upon contact of one of the displayed menu operation selections. A device for reproducing and storing audio and video signals on a storage medium as well as a second audio/video storage and reproduction device positioned and a second device for connection with an external source of audio and video signals are connected to the second processor. A user is able to operate the device using either audible and manual control signals.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views.

DESCRIPTION OF THE REFERENCED NUMERALS

Figure 1:
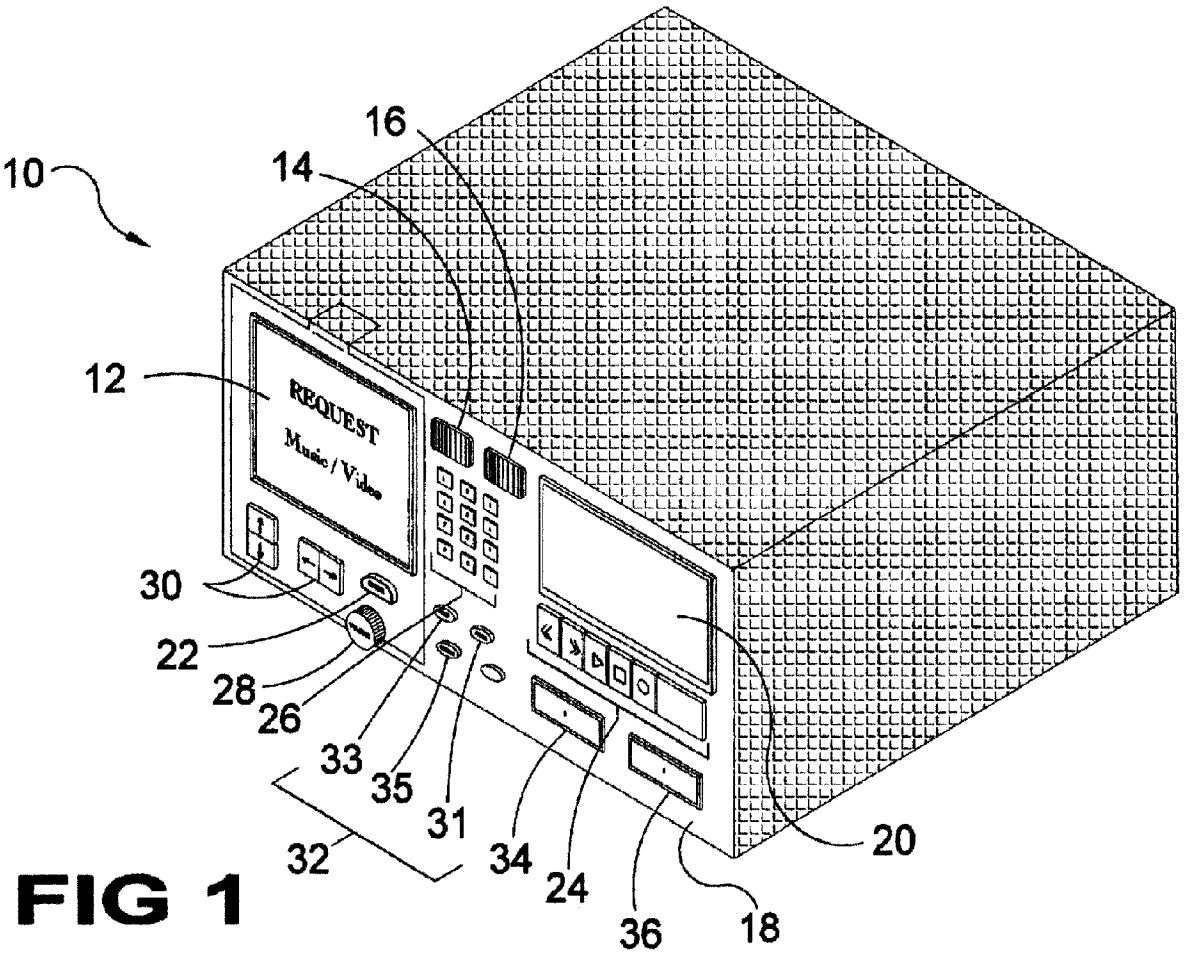
FIG. 1 is a top perspective view of a front side of the audio/video control device of the present invention.

Turning now descriptively to the drawings, in which similar reference characters denote similar elements throughout the several views, the Figures illustrate the audio/video control device of the present invention. With regard to the reference numerals used, the following numbering is used throughout the various drawing figures.

10 audio/video control device of the present invention
12 video monitor
14 speaker
16 microphone
18 face side of audio/video control device

20 ad/write CD ROM device
22 enter key
24 control keys for the CD player
26 alpha numeric keypad
28 volume knob
30 scroll buttons for moving a cursor on the touch screen display
31 store key
32 additional control keys
33 next key
34 first memory card port
35 source key
36 second memory card port
38 back side
40 power cord
42 electrical outlet
44 cable connector ports
46 telephone access ports
48 audio/video ports
50 portable section of the audio/video control device
52 base unit
54 recess
56 back side of the recess
58 connector port
60 top side of portable section
62 tab
63 nook in top side of portable section
64 third memory card port
66 headphone connector
68 side of portable section
70 speaker of portable section
72 memory card
74 rechargeable battery section of memory card
76 connection portion of memory card
78 processor of base unit
80 processor of portable section
82 power source of base unit
84 power source of portable section
86 cellular transmitter/receiver
88 central station
90 arrow indicating signal transmitted from control device to central station
92 arrow indicating signal transmitted from central station to control device

DETAILED DESCRIPTION OF THE PREFERRED EMBODIMENT

Turning now descriptively to the drawings, in which similar reference characters denote similar elements throughout the several views, FIGS. 1 through 7 illustrate the audio/video control device of the present invention indicated generally by the numeral 10.

The audio/video control device 10 is shown in FIG. 1. As can be seen from this figure, the audio/video control device 10 includes a touch screen display 12, a speaker 14 and a microphone 16 on a face side 18 thereof. The touch screen display 12 is provided for manual input of control commands. The touch screen display 12 is also able to provide video images for viewing by a user such as a movie or allow the user to play interactive video games thereon. The speaker 14 provides audio signals under the control of the audio/video control device 10. The audio signals correspond with the video signal being reproduced or a video game being played on the touch screen display 12. Alternatively, the audio signals may be representative of data signals stored on a storage medium and being reproduced by a component of the audio/video control device 10. The speaker 14 also provides interactive audio instructions to a user for aiding in controlling operation of the audio/video control device 10. The microphone 16 is provided for receiving audible command signals from a user in response to operating instructions displayed on the touch screen display 12 and audibilized through the speaker 14. These audible command signals are analyzed by the audio/video control device 10 and act to control operation thereof.

A read/write compact disc (CD) ROM drive 20 is provided in the audio/video control device 10. The CD ROM drive 20 is able to both reproduce audio and video signals stored on a storage medium such as a compact disc under the control of the audio/video control device 10 and burn audio and video signals into the storage medium for storage thereon. The stored audio and video signals may be reproduced by the CD ROM drive 20 at any desired time to provide a replay of the originally recorded audio and video signals. The audio signals will be reproduced through the speaker 14 and the video signals will be displayed on the touch screen display 12. A plurality of control keys 24 for the CD ROM drive 20 are provided on the face side 18 of the audio/video control device 10 along with an alpha numeric keypad 26. The control keys 24 are similar to the control keys on a conventional CD player and provide a user means for controlling the functioning of the CD ROM drive 20. The alpha numeric keypad 26 allows a user to enter information as requested visually on the touch screen display 12 or audibly through the speaker 14. Additional control keys 32 are provided on the face side 18 for controlling operation of the audio/video control device 10. These additional control keys 32 include a store key 31 for providing one touch recording of a video and/or audio signal, a next key 33 for advancing to a next selection of data stored on the storage medium being reproduced and a source key 35 for switching between sources of audio and video signals. Scroll keys 30 are provided for manually moving a cursor on the touch screen display 12 to highlight a desired function for operation. An enter key 22 is provided for entering information input using the control keys 32 and scroll keys 30. A volume knob 28 is provided for manually adjusting the volume of the audible signal generated by the speaker 14. First and second ports 32 and 34, respectively, are provided on the face side 18 for receiving memory cards therein. The memory cards are able to store audio and video data signals being produced and reproduced by the audio/video control device 10 and will be discussed hereinafter with specific reference to FIG. 5.

Figure 2:
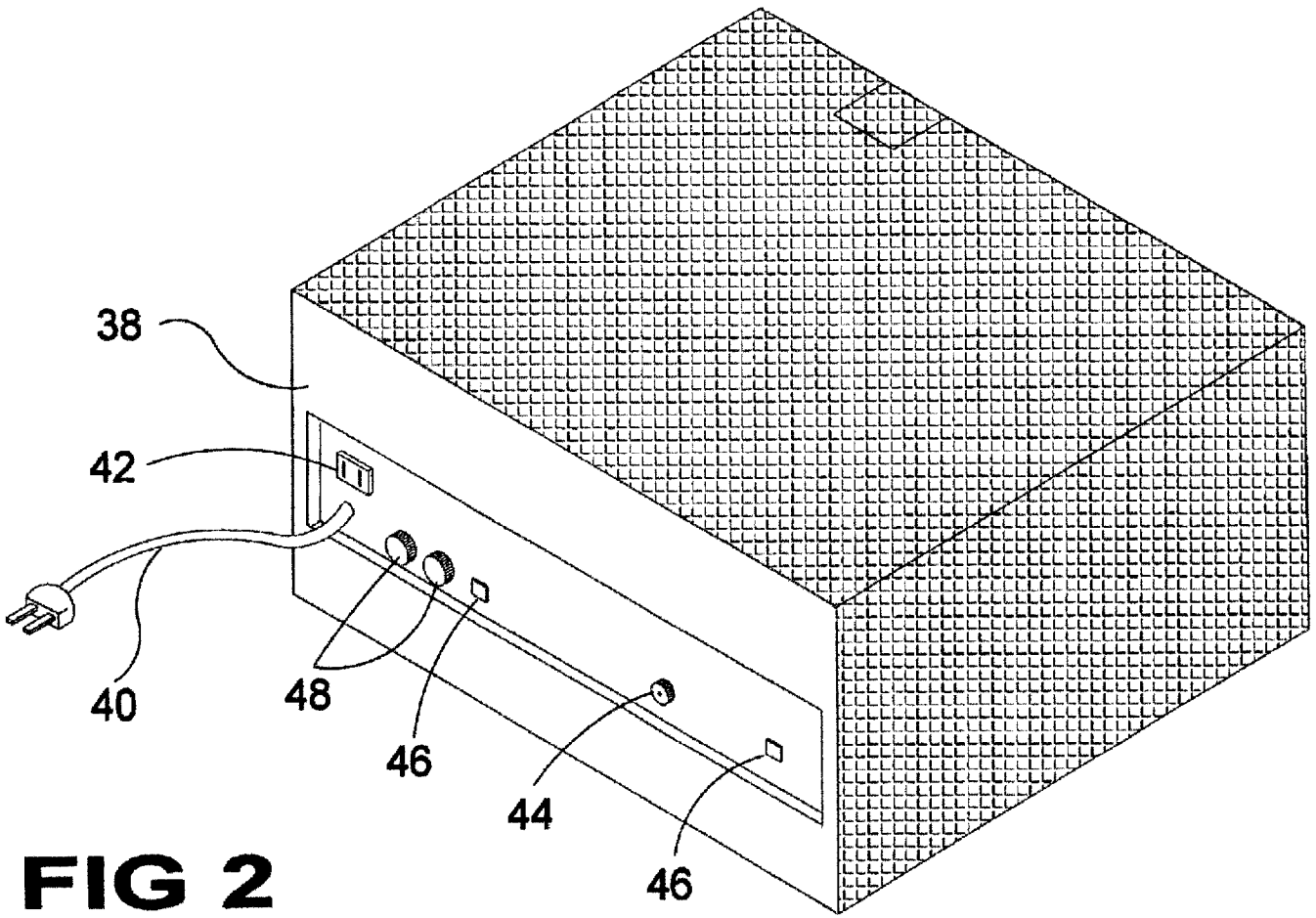
FIG. 2 is a top perspective view of the back side of the audio/video control device of the present invention.

A view of the back side 38 of the audio/video control device 10 is shown in FIG. 2. A power cord 40 is provided extending from the back side 38 for connection to an external power source (not shown). The power source provides power to the audio/video control device 10 through the power cord 40. An electrical outlet 42 is also provided on the back side 38 for connection with and supplying power to a peripheral component connected thereto. The power may be supplied to the peripheral component from an internal battery of the audio/video control device 10 or from power provided by the power source through the power cord 40. A cable connector port 44 is provided for connecting the audio/video control device 10 to a cable line and receiving audio and video signals therethrough. The cable line may provide direct access to an internet service provider thereby allowing the audio/video control device 10 to receive audio and video signals from the internet such as with a DSL service. Telephone access ports 46 are provided for connection to a telephone line for receiving and transmitting signals along the public switched telephone network. The telephone access ports 46 allow for alternative means for connection with the internet or any other device utilizing a modem or even to place a conventional telephone call through the device. When placing a conventional telephone call, the speaker 14 and microphone 16 can be used to communicate therethrough. When connecting to the internet, web pages will be displayed on the touch screen display 12. Audio/video access ports 48 are also provided for connection of the peripheral devices to the audio/video control device 10.

Figure 3:
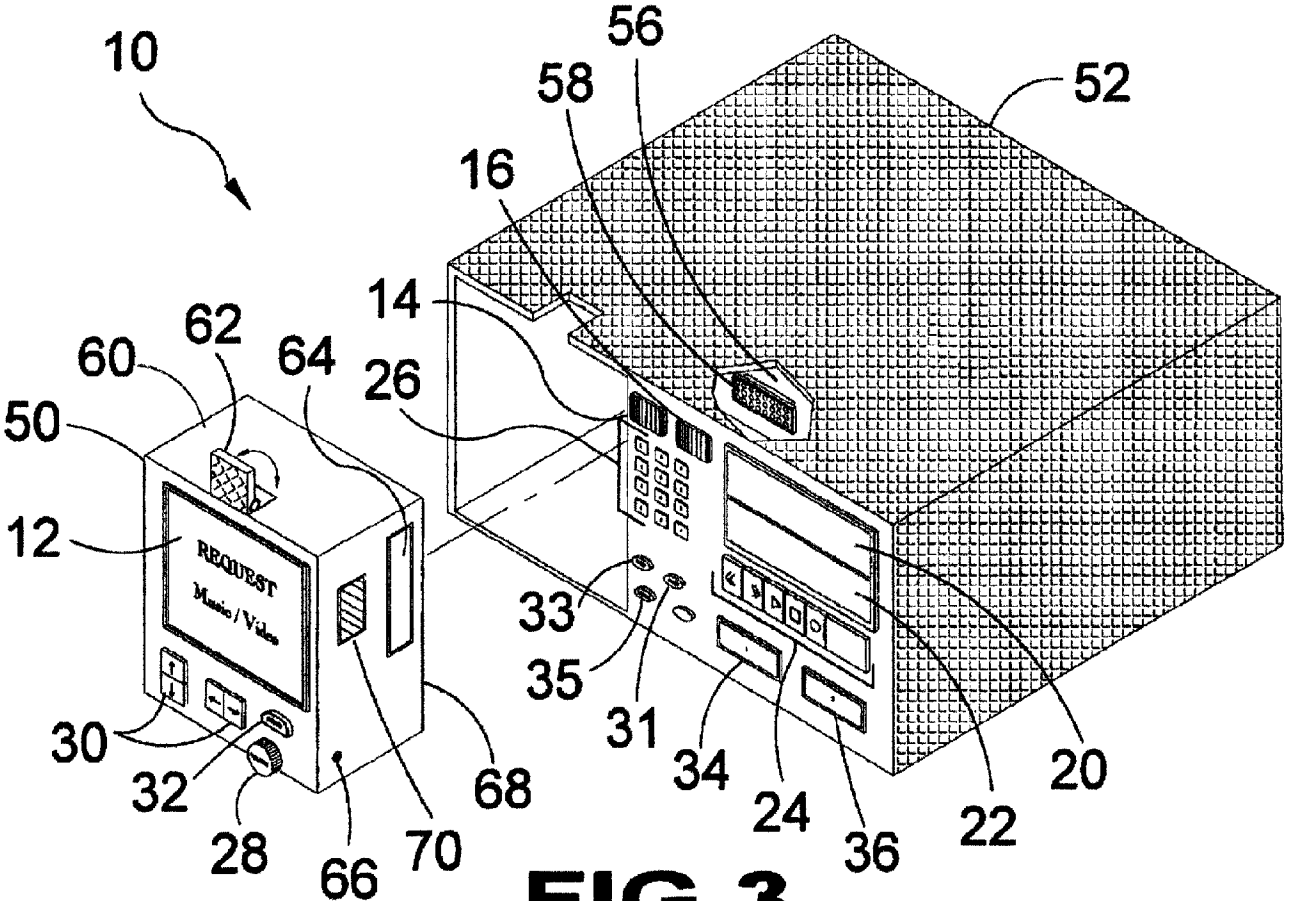
FIG. 3 is a top perspective view of the audio/video control device of the present invention including a main base unit and a portable unit.
Figure 4:
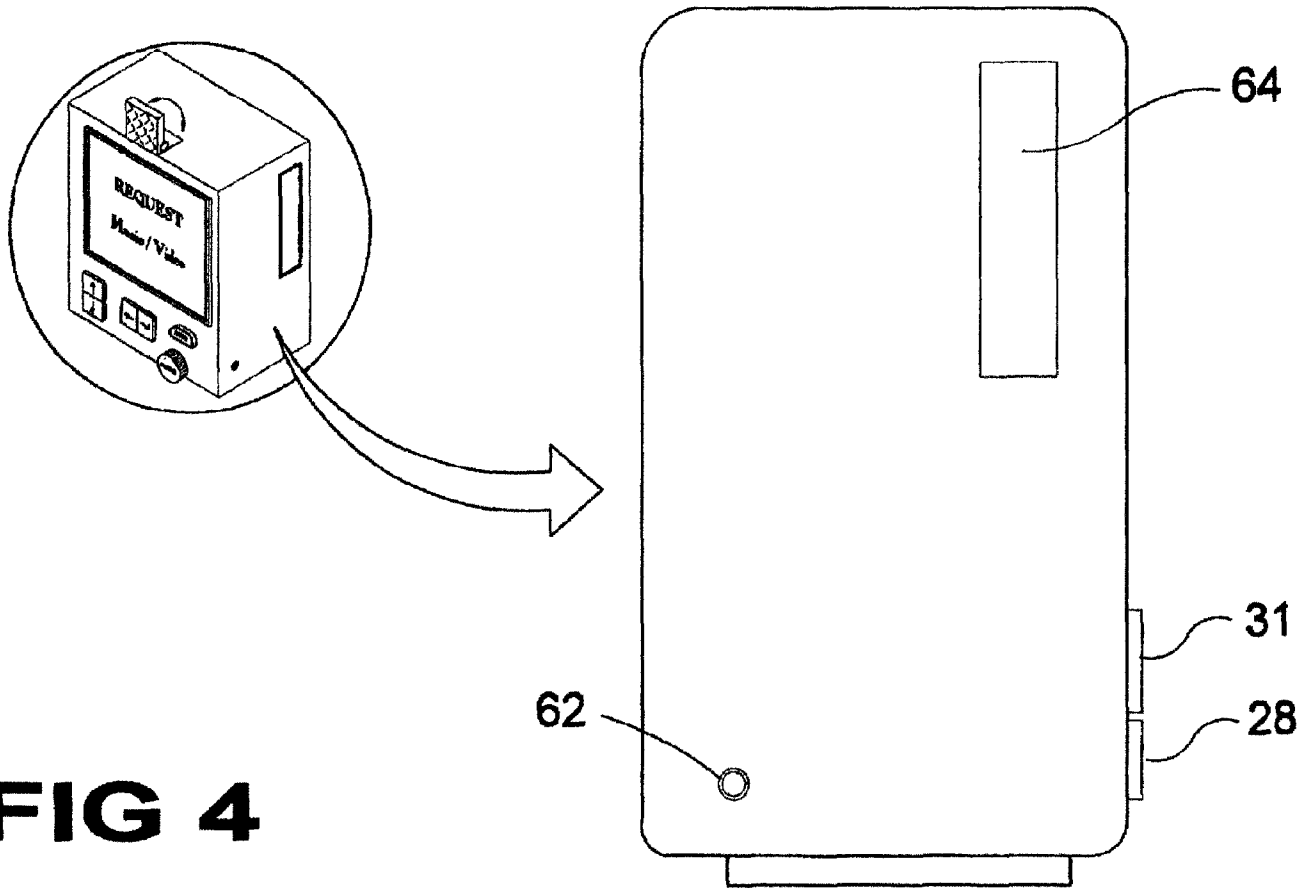
FIG. 4 is a side view of the portable unit of the audio/video control device of the present invention.

FIG. 3 shows the audio/video control device 10 including a portable section 50 and a base unit 52. The portable section 50 of the audio/video control device 10 is shown being separated from the base unit 52. The base unit 52 includes a recess 54 therein for retaining the portable section 50. Positioned at a back side 56 of the recess 54 is a connector port 58 for connection with the portable section 50 thereby allowing communication between the portable section 50 and the base unit 52. Certain ones of the control buttons described with respect to FIG. 1 are positioned on the portable section 50. When the portable section 50 is positioned within the recess 54 and connected to the base unit 52 through the connector port 58, the control buttons on the portable section 50 are able to control certain operations and functions of the base unit 52. On a top side 60 of the portable section 50 is a tab 62. The tab 62 is used to aid in removal of the portable section 50 from within the recess 54 and returning the portable section 50 to a position within the recess 54. The tab 62 is pivotally connected to the top side 60 to move as indicated by the arrow labeled with the numeral 61. The tab 62 is pivoted away from the top side 60 when the portable section 50 is being removed from or replaced in the recess 54. The tab 62 is pivoted towards the top side 60 when the portable section 50 is within the recess 54 and sits within a nook 63 in the top side 60 so as not to protrude therefrom. Positioned on a side 68 of the portable unit 50 is a third memory card port 64, a headphone connector 66 and speakers 70. The memory card port 64 is provided for receiving memory cards including data recorded thereon by the audio/video control device 10. The data includes both audio and video signals and is recorded on the memory card when received within either of the first and second memory card ports 34 and 36, respectively. The headphone connector port 66 is provided for connecting headphones (not shown) to the portable section 50 so that the user may listen to audio signals being reproduced by the portable section 50. The speakers 70 may be provided on a side of the portable section 50 thereby allowing the user to listen to audio signals being reproduced by the portable section 50 without headphones. The portable section 50 is able to detect if headphones are plugged into the headphone jack 66. Should no headphones be plugged into the headphone jack 66, any audio signals produced by the portable unit 50 will be audibilized through the speakers 70. Should headphones be plugged into the headphone jack 66, any audio signals produced by the portable unit 50 will be audibilized through the headphone jack 66 and the headphones. Preferably, the speakers 70 will be inoperative when headphones are inserted into the headphone jack 66. A view of a side 68 of the portable section 50 is illustrated in FIG. 4. The portable section 50 is shown in an inset view with the side 68 thereof enlarged. From this view, the third memory card port 64 is shown positioned on the side 68 along with the headphone jack 66 and the speaker 70.

Figure 5:
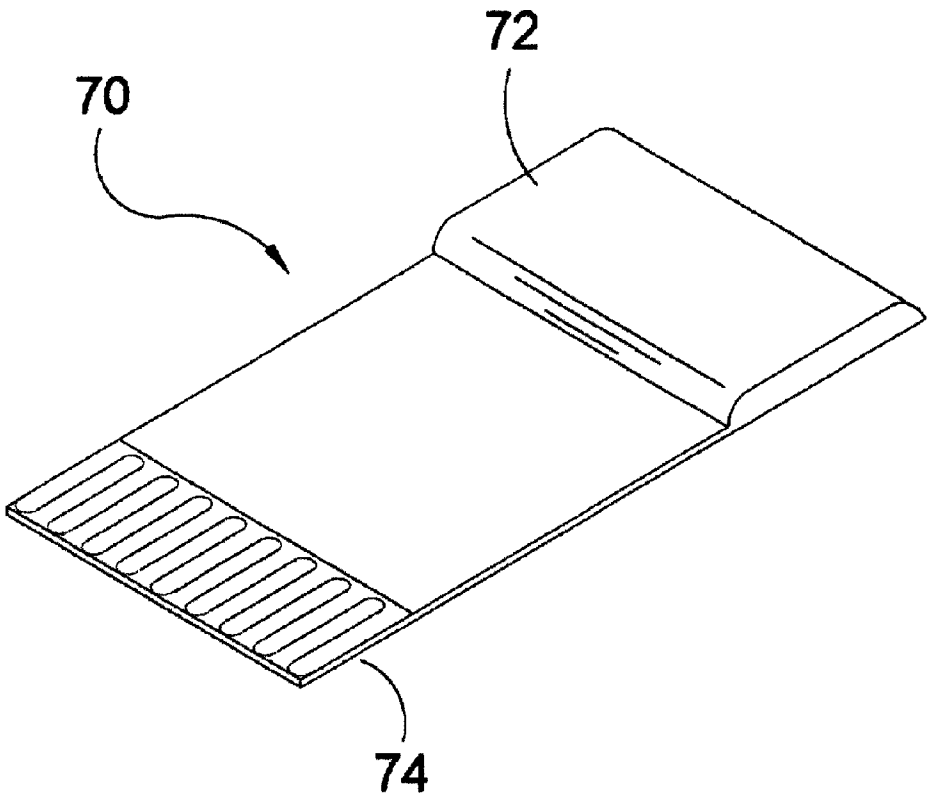
FIG. 5 is a top perspective view of a memory card for use with the audio/video control device of the present invention.

FIG. 5 shows a memory card 72 for receipt within one of the memory card ports of the on the audio/video control device 10. When positioned within a memory card port, data is either written on the memory card 72 or reproduced from the memory card 72. The memory card 72 includes a rechargeable battery section 74 and a connection portion 76. The rechargeable battery section 74 includes a rechargeable power source for providing additional power to aid in compressing data when recording data on the memory card 72 and decompressing the audio and video signals when reproducing the audio and video signals. The rechargeable power source is recharged by the power source internal to the portable section or the power source providing power to the audio/video control device 10 through the power cord 40 when positioned within one of the memory card ports. The connector portion 76 establishes an electrical connection with a connector positioned within the memory card ports. The connector portion 76 includes a plurality of individual connections for mating with respective connectors within the memory card ports. The connection section 76 includes a connector to the power supply of the audio/video control device 10, a connector to an audio signal output, a connector to an audio signal input, a connector to a video signal output and a connector to a video signal input. The memory card 72 and memory card ports are similar in design to those used with MP3 systems and operate in a similar manner. The memory card 72 is easily positioned within and removed from a desired memory card port. The connection section 76 is positioned with in the memory card port with the battery portion 74 extending from the memory card port. The battery portion 74 is used as a handle for insertion and removal of the memory card 72 from the memory card port. When inserting the memory card 72 into the memory card port, the battery portion 74 is grasped by the user and the connection section 76 s inserted into the port until grasped and held thereon. Upon removal the battery portion 74 is again grasped by the user and a force is applied in a direction opposite to the insertion direction until the memory card 72 is removed.

Figure 6:
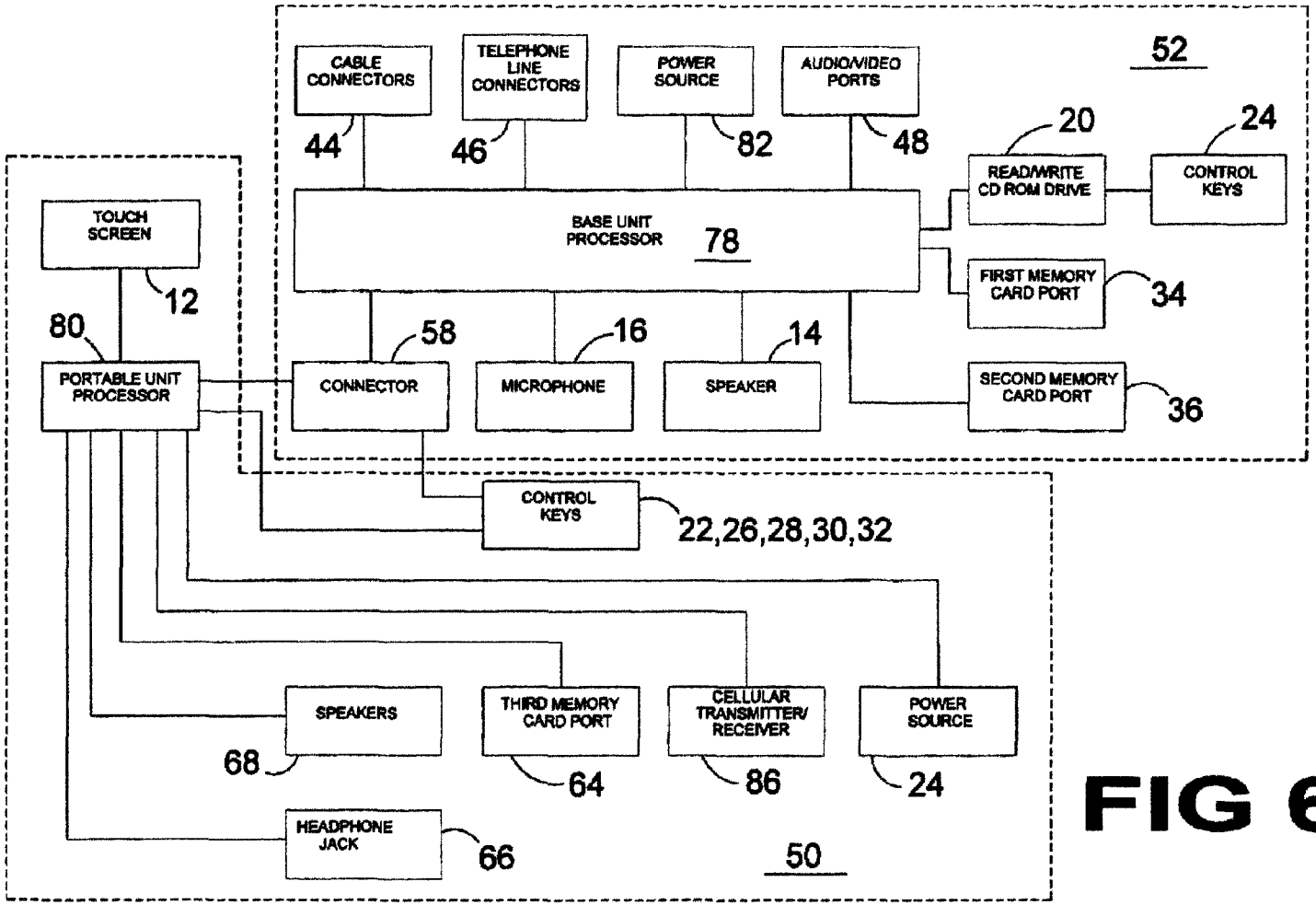
FIG. 6 is a block diagram of the audio/video control device of the present invention.

A block diagram illustrating the audio/video control device 10 is shown in FIG. 6. As can be seen from this figure, the base unit 52 includes a processor 78. The power cord or power source is connected to the processor 78 for providing power to the audio/video control device 10. The cable connectors 44, telephone line connector 46 and audio/video ports 48 are also connected to the processor 78. The cable connectors 44 provide a port for connection of the processor 78 to a cable line. The telephone line connectors 46 provide a port for connection of the processor 78 to the public switched telephone network (PSTN). The audio/video ports 48 provide a connection for a peripheral device to provide audio and video signals to the processor 78.

The read/write CD ROM drive 20 is connected to the processor 78 for reproducing audio signals from a storage medium inserted into the read/write CD ROM drive 20. The read/write CD ROM drive 20 is also able to store audio and video signals received by the audio/video control device 10 on a storage medium for reproduction at a later time. A plurality of control keys 24 are provided for controlling operation of the read/write CD ROM drive 20. The control keys 24 are similar to control keys found on conventional CD players. The read/write CD ROM drive 20 may also be controlled through audio signals provided to the processor and manual commands provided through the touch screen display 12 found in the portable section 50 as will be further discussed hereinafter. The first and second memory card ports 34 and 36, respectively, are provided for storing information on memory cards and reproducing audio and video signals previously stored on memory cards. The speaker 14 is connected to the processor 78 and provides audible instructions for aiding the user in controlling the operation of the audio/video control device 10. The speaker 14 makes the audio/video control device 10 an interactive system by audibly prompting the user to either audibly or manually input control commands. The speaker also provides an output for audio signals reproduced by the audio/video control device 10. The microphone 16 is connected to the processor 78 for receiving audible command signals from a user and providing the command signals to the processor 78 for analysis. The processor 78 controls the audio/video control device 10 based upon the analysis of the control signals received by the microphone 16.

A connection port 58 is provided in the base unit 52 for connection with the portable section 50. The portable section 50 includes a processor 80 which connects with the connection port 58 when the portable section 50 is placed within the recess 58 of the base unit 52. The processor 80 is thus connected with the processor 78 of the base unit 52. The touch screen display 12 is provided for displaying menu commands under the control of the processor 80 of the portable section 50. Upon contact with the touch screen display 12, command signals for control of the operation of the audio/video control device 10 are provided to the processor 80. The touch screen display 12 is also controlled by the processor 80 to display video signals being reproduced by the audio/video control device 10. When the portable unit 50 is connected to the base unit via the connection port 58, data provided to the processor 80 of the portable unit 50 is also provided to the processor 78 of the base unit 52 for analysis via the connection port 58. Control of the components of the audio/video control device 10 positioned in the base unit 52 via the touch screen display 12 is thus possible when the portable section 50 is positioned within the recess 54 and connected to the base unit 52 via the connection port 58. A plurality of control keys 22, 26, 28, 30 and 32 are also connected to the processor 80 of the portable section 50 and via the connection port 58 to the processor 78 of the base unit 52. Also connected to the processor 80 is the headphone jack 66 and speakers 70. The headphone jack 66 is provided with audio signals by the processor 80 thereby allowing a user to listen to audio signals generated by the portable unit 50 through headphones. When headphones are not connected to the headphone jack 66 any audio signals generated by the portable unit 50 are provided through the speakers 70. The third memory card port 64 is connected to the processor 80 of the portable section 50. The third memory card port 64 is able to receive a memory card 72 as discussed hereinbefore for reproducing audio and video signals stored on the memory card 72. The video signals will be displayed on the touch screen display 12 and the audio signals will be produced through one of the headphone jack 66 and speakers 70.

A cellular transmitter/receiver 86 is connected to the processor 80 for providing a wireless telephone connection through the portable section 50. The cellular transmitter/receiver 86 is also connected to the processor 78 of the base unit 52 via the processor 80 of the portable section 50 and the connection port 58. The cellular transmitter/receiver 86 is able to connect to a global computer network such as the internet through an internet service provider or with a central station which is able to provide audio and video signals to the audio/video control device 10. A power source 84 is also connected to the processor 80 for supplying power to the portable section 50.

Figure 7:
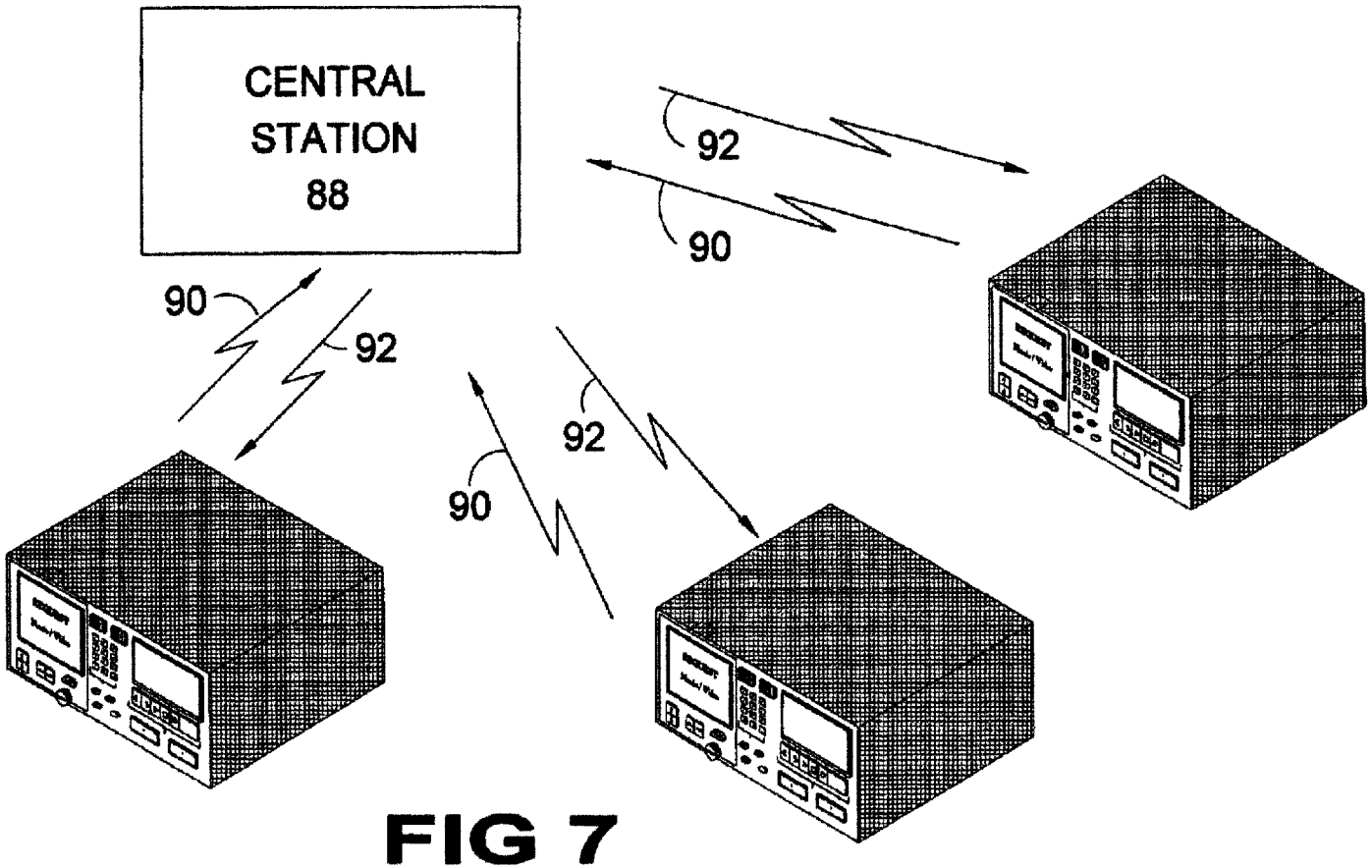
FIG. 7 is an illustration of a plurality of audio/video control devices in accordance with the present invention communicating with a central station.

An illustration of the audio/video control device 10 communicating with the central station 88 is shown in FIG. 7. The central station 88 is able to provide a desired type of entertainment for reproduction on the audio/video control device 10 and thereby cater to the tastes of a user. The central station 88 is preferably a subscriber service for which a user must register. Upon registration the user will be provided an access number which will establish an account for the user. The account number is stored within the audio/video control device 10. When the user dials a predetermined telephone number on the alphanumeric keypad 26, a signal indicated by the arrow labeled with the numeral 90 is transmitted to the central station 88. This signal includes data indicative of the access number for the particular audio/video control device 10 transmitting the signal. Upon receipt of the signal by the central station 88, the user access number is checked by the central station 88 against a data base of acceptable access numbers. If the activation code matches a stored activation code for an account in good standing, the user is granted access to the service. A notification signal indicated by the arrow labeled with the numeral 92 is transmitted by the central station 88 back to the audio/video control device 10 indicating whether the access number has been accepted by the system. The user can now select any type of entertainment provided by the central station through audio or manual commands provided to the audio/video control device 10. The audio/video control device will transmit these commands to the central station 88. In response to the command signals the central station 88 transmits audio and/or video signals back to the audio/video control device for the entertainment of the user.

The operation of the audio/video control device 10 will now be described with reference to the figures. In operation, the audio/video control device 10 is used by a person to reproduce audio and video signals as well as to store audio and video signals on a tangible medium. The audio/video control device 10 can further be used to establish either a hardwired or wireless connection with a peripheral device, the internet or a central station to receive audio and video signals for entertaining the user of the audio/video control device 10. The audio/video control device 10 includes a base unit 52 and a portable section 50. The portable section 50 is releasably connected to the base unit 52 and may be used remotely from the base unit 52 as desired. In order to use the portable section remotely, the user must disconnect the portable section 50 from the connector port 58 by pulling the portable section 50 out from within the recess 54 in the base unit 52. Alternatively, the portable section 50 and base unit 52 may be operated together in a connected state.

The audio/video control device 10 is able to receive both audible and manual control signals from a user to operate. The audible signals are entered through the microphone 16 and the manual signals are entered through use of a touch screen display 12 and a plurality of control buttons. Menus of operating functions are displayed on the touch screen display 12 under the control of the processor 80. The speaker 14 provides audible interactive instructions for operating the audio/video control device 10. The audible interactive instructions are based upon the menu presently displayed by the touch screen display 12. When the user is prompted via the touch screen display 12 or through the speaker 14 to enter a control command, the user will either speak a command into the microphone or touch the appropriate selection on the touch screen display 12. The user may then activate one of the control keys to further control the operation of the audio/video control device 10.

If the user wishes to operate the read/write CD ROM drive 20, the user will activate a desired control key 24. These control keys 24 allow a user to either play or record data on a compact disk and function as control keys of a conventional compact disk player. When the user selects to play a disk, the audio signals stored on the disk will be reproduced through the speakers 14 and video signals stored on the disk will be viewable on the touch screen display 12. When a user desires to record audio and/or video signals on a disk, the user must select the appropriate command by activating a command key. In order to store audio and video signals on a disk, it is necessary for another component of the audio/video control device 10 to be operating and thus provide audio and video signals to the read/write CD ROM drive 20. Audio and video signals may be provided from a peripheral device connected through the audio and video input ports 48, an audio and/or video source connected through the cable connectors or telephone line connectors, an audio and/or video source connected through the cellular transmitter/receiver 88 or from a memory card 72 received within one of the memory card ports 34, 36 and 64.

When a user wishes to store data on a memory card or reproduce data previously stored on a memory card, the appropriate commands must be entered either audibly or manually by pressing the appropriate selection(s) on the touch screen display 12. The user may scroll through the possible selections on the touch screen display 12 using the scroll keys 30, highlighting a different selected option each time the scroll key is activated. When the desired option for reproduction of audio and/or video signals on a memory card 72 is highlighted, the user will activate the enter key 22. When a user desires to record audio and/or video signals on a memory card 72, the user must select the appropriate command by activating a command key. In order to store audio and video signals on a memory card 72, it is necessary for another component of the audio/video control device 10 to be operating and thus provide audio and video signals to the desired memory card port 34, 36 or 64. Audio and video signals may be provided from a peripheral device connected through the audio and video input ports 48, an audio and/or video source connected through the cable connectors or telephone line connectors, an audio and/or video source connected through the cellular transmitter/receiver 88 or from a disk received within the read/write CD ROM drive 20.

Options for operation of the audio/video control device 10 also include utilizing a wired connection to the PSTN for placing a telephone call, a cable connection to connect to an ISP for internet connection, a cellular receiver/transmitter for placing a cellular telephone call to a desired person, an ISP or to the central station 88. Each of these options may be selected through the touch screen display 12 or via an audible signal into the microphone 16. Operation of the connection with the central station is described above with reference to the description of FIG. 7. The speaker 14 also provides audible guidance for the user to operate the audio/video control device 10. The speaker 14 provides audio messages instructing the user through the operation procedure for the audio/video control device 10 and describing the different options available to the user. Upon selecting the desired option, the audio/video control device 10 will perform the selected function until the user requests that the operation halt.

When performing a manual entry of operating commands, the processor 80 within the portable section 50 will analyze the command input on the touch screen display 12. Should the command be directed to the operation of components controlled by the processor 78 within the base unit 52, a signal indicative of such will be transmitted from the processor 80 thereto through the connection port 58. The processor 78 will then control the operation of the proper component to perform the desired function. When using the cellular transmitter/receiver 86, the cellular transmitter/receiver 84 will be controlled by the processor 80 in the portable section 50 to place a wireless telephone call to a desired party, e.g. an ISP, an individual, etc. . . . If the command signal to use the cellular transmitter/receiver 86 was received through the touch screen display 12 or other control keys, the processor 80 will directly control the operation thereof. If the command signal was input using an audible signal using the microphone 16, the processor 78 of the base unit 52 will provide a command signal to the processor 80 through the connection port 58 to control the cellular transmitter/receiver 86.

The portable section 50 can also be used separately from the base unit 52. The portable section 50 is preferably of a size and shape which is easily carried by a user and unobtrusive. The portable section 50 is removed from its connection to the base unit 52 by lifting a tab 62 thereatop and applying a pulling force to remove the portable section 50 from within its recess 58 in the base unit 52. The pulling force on the tab 62 causes the portable section 50 to be disconnected from the connection port 58 and removed from within the recess 54. The portable section 50 can now be used separately from the base unit 52. In order to operate the portable section 50, the user must enter a command on the control keys or on the touch screen display 12. The user will use the control keys and the touch screen display 12 in the same manner as described before. When reproducing an audio signal, the audio signal will be provided by the processor 80 to the headphone jack 66 for listening through headphones connected thereto. Should headphones not be connected to the headphone jack 66, the audio signals will be provided to speakers 70. Reproduction and storage of audio and video signals on a memory card 72 are performed similarly to that described above with respect to the base unit 52.

When it is desired to contact the central station via the cellular transmitter/receiver 86, the user must select the appropriate options on the touch screen display 12. Upon selection of the desired option, the processor 80 will control the cellular transmitter/receiver to place a wireless telephone call to the central unit to establish a connection therewith. Upon establishment of the connection, the user must select the desired option as indicated on a menu on the touch screen display 12 to receive the desired type of entertainment from the central station.

The audio/video control device 10 of the present invention is a completely user interactive system providing for audio and manual input of control commands for operation thereof. This device provides numerous different options for reproduction and storage of audio and video signals and a user friendly procedure for operation. A portable section of the device allows the user to carry along an unobtrusive device to provide entertainment while traveling. The manual input of commands for [oOperation] *operation* is a menu driven system including audio signals which accompany the menu to provide added ease of operation. Furthermore, the user is able to input audible signals through a microphone which are analyzed by the audio/video control device 10 for control of the operation thereof.

From the above description it can be seen that the audio/video control device of the present invention is able to overcome the shortcomings of prior art devices by providing an audio/video control device which is able to receive both audio command signals and manually input control signals through a touch screen for controlling operation thereof. The audio/video control device includes a portable section removably connected to a main base unit, the base unit being able to store data on a memory card for reproduction by the portable section. The audio/video control device also includes a read/write CD ROM drive, a video screen and control buttons for operating these devices, wherein the video screen is able to display video images such as a movie and interactive video games for entertaining a user. The audio/video control device further includes a cellular transmitter/receiver for connecting with a central station for wireless reception of audio and video signals and connection ports for telephone and cable lines providing alternate sources of audio and video signals. Furthermore, the audio/video control device of the present invention is simple and easy to use and economical in cost to manufacture.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is:

1. [Au] *An* audio/video control device comprising:

a) a base unit including:

i) a housing having a recess extending therein;

ii) a first processor for controlling operation of said base unit;

iii) a first audio/video storage and reproduction device positioned within said housing and controlled by said *first* processor to one of store and reproduce at least one of audio and video signals thereon;

iv) first means for connection with an external source of audio and video signals for at least one of reproduction and storage by said base unit; and v) means connected to said first processor for receiving audible control signals in response to which said first processor controls operation of said *first audio/video storage and reproduction* device; and b) a portable unit releasably connected to said base unit, said portable unit being operable jointly and separably within said recess in said housing of said base unit, said portable unit including:

i) a second processor;

ii) means for selectively connecting said second processor to said first processor;

iii) a touch screen display connected to said second processor for displaying a menu of operation selections and providing manual control signals to said second processor for controlling operation of said *first audio/video storage and reproduction* device upon contact by a user of one of said operation selections in said displayed menu;

iv) means for reproducing and storing audio and video signals on a storage medium;

v) a second audio/video storage and reproduction device positioned within said housing and controlled by said *second* processor;

vi) second means for connection with an external source of audio and video signals for reproduction and storage by said base unit, wherein a user is able to operate said base unit and said portable unit either jointly or separably through at least one of audible and manual control signals; and vii) said touch screen display in said portable unit functioning as sole interactive display for said base unit both when said portable unit is connected to said base unit and when said portable unit is removed from said base unit.

2. The audio/video control device as recited in claim 1, wherein said base unit further includes means for connecting said first processor with said second processor positioned within said recess.

3. The audio/video control device as recited in claim 2, wherein said base unit further includes a speaker connected to said first processor for audibly providing operating instructions to a user for controlling operation of said *first audio/video storage and reproduction* device.

4. The audio/video control device as recited in claim 1, wherein said first audio/video storage and reproduction device is a read/write CD ROM drive.

5. The audio/video control device as recited in claim 1, wherein said first audio/video storage and reproduction device is a memory card port for receiving a memory card, said memory card including means for storing audio and video data thereon and a rechargeable battery, wherein said memory card is connected to said first [microprocessor] *processor* upon insertion into said memory port.

6. The audio/video control device as recited in claim 1, wherein said second audio/video storage and reproduction device is a memory card port for receiving a memory card, said memory card including means for storing audio and video data thereon and a rechargeable battery, wherein said memory card is connected to said first [microprocessor] *processor* upon insertion into said memory port.

7. The audio/video control device as recited in claim 3, wherein said base unit further includes a memory card port for receiving a memory card, said memory card including means for storing audio and video data thereon and a rechargeable battery, wherein said memory card is connected to said first [microprocessor] *processor* upon insertion into said memory port.

8. The audio/video control device as recited in claim 1, wherein said first means for connection with an external source of audio and video signals is one of a cable connection port, a telephone line connection port or an audio/video connector.

9. The audio/video control device as recited in claim 8, wherein said cable connection port provides a direct connection of said first processor to a global communications network.

10. The audio/video control device as recited in claim 1, wherein said first processor displays video reproduced from one of said first audio/video storage and reproduction device and said means for connection with an external source of audio and video signals on said touch screen display when said portable device is positioned in said recess.

11. The audio/video control device as recited in claim 1, wherein said portable unit further includes control keys for manually providing control signals to said second processor.

12. The audio/video control device as recited in claim 1, wherein said second means for connection with an external source of audio and video signals is a cellular transmitter/receiver.

13. The audio/video control device as recited in claim 1, wherein said base unit [farther] *further* includes a second memory card port for receiving a memory card, said memory card including means for storing audio and video data thereon and a rechargeable battery, wherein said memory card is connected to said first [microprocessor] *processor* upon insertion into said memory port.

14. The audio/video control device as recited in claim 1, wherein said means for receiving audible control signals is a microphone.

15. The audio/video control device as recited in claim 1, wherein said portable unit further includes a headphone jack connected to said second processor for audibilizing reproduced audio signals.

16. The audio/video control device as recited in claim 1, wherein the recess for said portable unit is located on a front face of said base unit, a top surface of said portable unit having a tab extending through a top surface of said base unit for permitting convenient release of said portable unit from said base unit, said tab rotatable between a position flush with said top surface of said base unit and a pop up position for removal of said portable unit.

17. The audio/video control device as recited in claim 16, wherein said portable unit further includes a speaker connected to said second processor for audibilizing reproduced audio signals, the speaker on said portable unit being disconnected and hidden when said portable unit is in said recess of said base unit.

18. A system for providing audio and/or video signals to a remote user, said system comprising:

a) a central station including:

i) a data base for storing acceptable access numbers;

ii) a first processor connected to said data base;

iii) a first receiver; and

[iii)] *iv*) a first [trotter] *transmitter* for transmitting audio and/or video signals; and b) an audio/video control device located remotely from said central station, said audio/video control device including:

i) a memory for storing an access number;

ii) a second transmitter for transmitting the access number to said central unit;

iii) a second receiver for receiving audio and/or video signals from said central unit;

iv) a second processor;

v) control keys for generating control signals and controlling said processor to activate said *second* transmitter to transmit said access number and control signals to said central station;

vi) a speaker for reproducing audio signals received from said central station; and vii) a removable portable unit within said control device containing a display for reproducing video signals received from said central station, wherein the display functions as sole interactive display for said control device when said portable unit is connected to said control device and when said portable unit is removed from said control device, and wherein when a user desires to listen to audio signals and/or view video signals transmitted by said central unit, the user activates said control keys causing said second transmitter to transmit said access number to said central station whereupon said first processor checks the access number against said data base of acceptable access numbers and upon [deter] *determination* said access number is acceptable said first transmitter transmits audio and/or video signals to said audio/video control device for reproduction thereby.

19. The system as claimed in claim 18, further comprising a plurality of audio/video control devices, each of said audio/video control devices having a unique access number stored in said memory and being authorized to receive audio and/or video signals from said central station.

20. The system as claimed in claim 18, wherein said central station is able to transmit any of a selection of audio and video signals to said audio/video control device and said control keys each generate a respective control signal for transmission to said central station upon activation, wherein each control signal is indicative of a respective selection of audio and video signals to be transmitted by said central station.

21. The system as claimed in claim 20, wherein said transmitter within said audio/video control device is a cellular transmitter.

22. The system as claimed in claim 21, wherein said control keys include an alphanumeric keypad for dialing an access telephone number for said central station to establish communication therewith.

23. The system as claimed in claim 22, wherein said audio/video control device further includes a microphone for receiving audible control commands from the user and provides the audible control commands to said second processor for analysis and transmission to said central station.

24. The system as claimed in claim 18, wherein said central station transmits a signal indicative of transmission of an unauthorized access number by said audio/video control unit upon determining the access number is not acceptable.

*25. An audio/video control device comprising:*

*i) a base unit configured to receive an audio/video storage and reproduction device and including a means for connection with an external source of audio and video signals for at least one of reproduction and storage by the audio/video storage and reproduction device;*

*ii) a portable unit releasably connected, hardwired or wirelessly, to said base unit and having a touch screen display displaying a menu of operation selections and providing manual control signals for controlling operation of the portable unit upon contact by a user of one of said operation selections in said displayed menu, said portable unit enables a user to control operation of the audio/video storage and reproduction device and the means for connection with the external source of audio and video signals, and wherein the touch screen display functions as the sole interactive touch screen operational control display for said base unit.*

*26. The audio/video control device as recited in claim 25, further comprising means for voice activation.*

*27. The audio/video control device as recited in claim 25, further comprising means for audible interaction.*

*28. The audio/video control device as recited in claim 25, wherein said audio/video storage and reproduction device comprises a read/write CD ROM drive.*

*29. The audio/video control device as recited in claim 25, wherein said audio/video storage and reproduction device is a memory card port for receiving a memory card, said memory card including means for storing audio and video data thereon and a rechargeable battery, wherein said memory card is connected to a microprocessor upon insertion into said memory port.*

*30. The audio/video control device as recited in claim 25, wherein said audio/video storage and reproduction device is a memory card port for receiving a memory card, said memory card including means for storing audio and video data thereon, wherein said memory card is connected to a microprocessor upon insertion into said memory port.*

*31. The audio/video control device as recited in claim 25, further comprising a microphone.*

*32. The audio/video control device as recited in claim 25, further comprising an alphanumerical keypad for manually providing control signals.*

*33. The audio/video control device as recited in claim 25, further comprising additional control keys for manually providing control signals.*

*34. The audio/video control device as recited in claim 25, further comprising an internal battery for supplying power.*

*35. The audio/video control device as recited in claim 25, further comprising means for wireless communication.*

*36. The audio/video control device as recited in claim 25, further comprising means for playing interactive video games.*

*37. The audio/video control device as recited in claim 25, further comprising means for placing and receiving a cellular telephone call.*

*38. The audio/video control device as recited in claim 25, further comprising means for placing and receiving a telephone line connection call.*

*39. The audio/video control device as recited in claim 25, comprising the means to establish either a hardwired or wireless connection with a peripheral device, the Internet, or a central station to receive audio and video signals for entertaining the user of said audio/video control device.*

*40. The audio/video control device as recited in claim 25, further comprising a speaker for reproducing audio signals.*

*41. The audio/video control device as recited in claim 40, wherein said portable unit enables the user to control speaker operation both when said portable unit is connected to said base unit and when said portable unit is removed from said base unit.*

*42. The audio/video control device as recited in claim 25, wherein the touch screen display functions as the sole interactive touch screen operational control display for said base unit control device when said portable unit is connected to said base unit control device and when said portable unit is removed from said base unit control device.*

*43. An audio/video control device comprising:*

*a base unit housing a speaker for reproducing audio signals; and*

*a portable unit releasably connected, by hardwired or wireless connection, to said base unit and having a touch screen display displaying a menu of operation selections and providing manual control signals for controlling operation of the portable unit upon contact by a user of one of said operation selections in said displayed menu,*

*wherein said portable unit enables a user to control operation of said speaker housed in said base unit, the portable unit is able to be releasably connected to said base unit, and the touch screen display functions as the sole interactive touch screen operational control display for said base unit.*

*44. The audio/video control device as recited in claim 43, further comprising means for voice activation.*

*45. The audio/video control device as recited in claim 43, further comprising a microphone for receiving voice commands.*

*46. The audio/video control device as recited in claim 43, further comprising an alphanumerical keypad for providing manual control signals.*

*47. The audio/video control device as recited in claim 43, further comprising additional control keys for providing manual control signals.*

*48. The audio/video control device as recited in claim 43, further comprising a read/write CD ROM drive for providing audio/video storage and reproduction.*

*49. The audio/video control device as recited in claim 43, further comprising a memory card port for receiving a memory card for providing audio/video storage and reproduction; said memory card including means for storing audio and video data thereon and a rechargeable battery; wherein said memory card is connected to a microprocessor upon insertion into said memory card port.*

*50. The audio/video control device as recited in claim 43, further comprising a memory card port for receiving a memory card for providing audio/video storage and reproduction; said memory card including means for storing audio and video data thereon; wherein said memory card is connected to a microprocessor upon insertion into said memory card port.*

*51. The audio/video control device as recited in claim 43, further comprising means for rechargeable power.*

*52. The audio/video control device as recited in claim 43, further comprising means for playing interactive video games.*

*53. The audio/video control device as recited in claim 43, further comprising a wireless transmitter and receiver for connecting with an external source of audio and video signals.*

*54. The audio/video control device as recited in claim 43, further comprising a cable connector port for connecting with an external source of audio and video signals.*

*55. The audio/video control device as recited in claim 43, further comprising a telephone line connector port for connecting with an external source of audio and video signals.*

*56. The audio/video control device as recited in claim 43, further comprising an audio/video connector port for connecting with an external source of audio and video signals.*

*57. The audio/video control device as recited in claim 43, further comprising a wireless transmitter and receiver, or a cable connector port, or a telephone line connector port to connect to a subscriber service central station as an external source of audio and video signals.*

*58. The audio/video control device as recited in claim 43, further comprising a wireless transmitter and receiver, or a cable connector port, or a telephone line connector port to connect to the Internet as an external source of audio and video signals.*

*59. The audio/video control device as recited in claim 43, further comprising a wireless transmitter and receiver, or a cable connector port, or a telephone line connector port to connect to a peripheral device as an external source of audio and video signals.*

*60. The audio/video control device as recited in claim 43, further comprising means to establish a hardwired and/or wireless connection with a peripheral device, or the Internet, or a subscriber service central station to receive audio and video signals for entertaining the user of said audio/video control device.*

*61. The audio/video control device as recited in claim 43, further comprising a wireless transmitter and receiver for placing and receiving a cellular telephone call.*

*62. The audio/video control device as recited in claim 43, further comprising a cable connector port and/or a telephone line connector port for placing and receiving a telephone line connection call.*

*63. An audio/video control device as recited in claim 43, wherein said portable unit enables the user to control operation of said speaker housed in said base unit both when said portable unit is connected to said base unit control device and when said portable unit is removed from said base unit control device.*

*64. An audio/video control device as recited in claim 43, wherein the touch screen display functions as the sole interactive touch screen operational control display for said base unit when said portable unit is connected to said base unit and when said portable unit is removed from said base unit.*

*65. A system for providing audio and/or video signals to a remote user, said system comprising:*

*a central station including a receiver and a transmitter for transmitting audio and/or video signals, and for connecting with an audio/video control device located remotely from the central station:*

*said audio/video control device including a receiver and a transmitter for connecting with said central station,*

*said audio/video control device comprising a base unit housing a speaker for reproducing audio signals and a portable unit having a touch screen video display for displaying video, displaying a menu of operation selections and providing manual control signals for controlling operation of the portable unit upon contact by a user of one of said operation selections in said displayed menu,*

*wherein the portable unit is able to be releasably connected to the base unit and the touch screen video display functions as the sole interactive touch screen video display for the base unit when said portable unit is connected to said base unit and when said portable unit is removed from said base unit.*

*66. The system as claimed in claim 65, further comprising a plurality of audio/video control devices, each of the audio/video control devices having a unique access number stored in memory and being authorized to receive audio and/or video signals from the central station.*

*67. The system as claimed in claim 65, wherein the central station is a subscriber service.*

*68. The system as claimed in claim 65, further comprising a wireless transmitter and receiver for connecting the central station with a remotely located audio/video control device.*

*69. The system as claimed in claim 65, further comprising a cable line connection for connecting the central station with a remotely located audio/video control device.*

*70. The system as claimed in claim 65, further comprising a telephone line connection for connecting the central station with a remotely located audio/video control device.*

*71. The system as claimed in claim 65, wherein the central station can establish a hardwired and/or wireless connection with a remotely located audio/video control device.*

*72. The system as claimed in claim 65, further comprising means for voice activation.*

*73. The system as claimed in claim 65, wherein the audio/video control device further comprises a microphone for receiving voice commands.*

*74. An audio/video control device comprising:*

*a portable unit having a touch screen display for displaying a graphical user interface of operation selections and providing manual control signals for controlling operation of the portable unit upon contact by a user of one of said operation selections in said user interface, wherein said portable unit enables a user to control speaker operation of a base unit device having means to receive audio or audiovisual content, the portable unit being configured to releasably connect to the base unit device, and wherein the touch screen display of one or more of the portable units functions as the sole interactive touch screen operational control display for the base unit.*

*75. The audio/video control device as recited in claim 74, further comprising means for voice activation.*

*76. The audio/video control device as recited in claim 74, further comprising means for audible interaction.*

*77. The audio/video control device as recited in claim 74, wherein the base unit is operable to receive an audio/video storage and reproduction device.*

*78. The audio/video control device as recited in claim 77, wherein said audio/video storage and reproduction device comprises a read/write CD ROM drive.*

*79. The audio/video control device as recited in claim 77, wherein said audio/video storage and reproduction device is a memory card port for receiving a memory card, said memory card including means for storing audio and video data thereon, wherein said memory card is connected to a microprocessor upon insertion into said memory port.*

*80. The audio/video control device as recited in claim 74, further comprising means for wireless communication.*

*81. An audio/video control device comprising:*

*a base unit device configured to receive and present audio or audiovisual content, the base unit configured to be controlled by a portable unit comprising a touch screen display for displaying a graphical user interface of operation selections and providing manual control signals for controlling operation of the portable unit upon contact by a user of one of the operation selections in the displayed user interface, wherein presentation of said audio or audiovisual content is controllable by the portable unit, the base unit device being configured to releasably connect to said portable unit, and wherein the presentation of said audio or audiovisual content through said base unit device is configured to be controlled solely through the touch screen display functions of one or more of said portable units.*

*82. The audio/video control device as recited in claim 81, further comprising means for voice activation.*

*83. The audio/video control device as recited in claim 81, further comprising means for audible interaction.*

*84. The audio/video control device as recited in claim 81, further comprising an audio/video storage and reproduction device.*

*85. The audio/video control device as recited in claim 84, wherein said audio/video storage and reproduction device comprises a read/write CD ROM drive.*

*86. The audio/video control device as recited in claim 84, wherein said audio/video storage and reproduction device is a memory card port for receiving a memory card, said memory card including means for storing audio and video data thereon, wherein said memory card is connected to a microprocessor upon insertion into said memory port.*

*87. The audio/video control device as recited in claim 81, further comprising means for wireless communication.*

*88. An audio/video control device comprising:*

*a portable unit having a touch screen display for displaying a graphical user interface of operation selections and providing manual control signals for controlling operation of the portable unit upon contact by a user of one of said operation selections in said user interface, wherein said portable unit enables a user to control operation of a base unit for reproduction of audio or audiovisual content, the operation of the base unit including operation of an audio/video storage and reproduction device configured to be received by the base unit and operation of a means for connection of the base unit with an external source of audio and video signals, the portable unit being configured to releasably connect to the base unit device, and wherein the touch screen display of one or more of the portable units functions as the sole interactive touch screen operational control display for the base unit.*

*89. The audio/video control device as recited in claim 88, further comprising means for voice activation.*

*90. The audio/video control device as recited in claim 88, further comprising means for audible interaction.*

*91. The audio/video control device as recited in claim 88, wherein said audio/video storage and reproduction device comprises a read/write CD ROM drive.*

*92. The audio/video control device as recited in claim 88, wherein said audio/video storage and reproduction device is a memory card port for receiving a memory card, said memory card including means for storing audio and video data thereon, wherein said memory card is connected to a microprocessor upon insertion into said memory port.*

*93. The audio/video control device as recited in claim 88, further comprising means for wireless communication.*

*94. An audio/video control device comprising:*

*a base unit device configured to receive and present audio or audiovisual content, receive an audio/video storage and reproduction device, and including a means for connection with an external source of audio and video signals for at least one of reproduction and storage by the audio/video storage and reproduction device, the audio/video storage and reproduction device and the means for connection with the external source of audio and video signals configured to be controlled by a portable unit for reproduction of audio or audiovisual content, the portable unit comprising a touch screen display for displaying a graphical user interface of operation selections and providing manual control signals for controlling operation of the portable unit upon contact by a user of one of the operation selections in the displayed user interface, wherein presentation of said audio or audiovisual content is controllable by the portable unit, the base unit device being configured to releasably connect to said portable unit, and wherein the presentation of said audio or audiovisual content through said base unit device is configured to be controlled solely through the touch screen display functions of one or more of said portable units.*

*95. The audio/video control device as recited in claim 94, further comprising means for voice activation.*

*96. The audio/video control device as recited in claim 94, further comprising means for audible interaction.*

*97. The audio/video control device as recited in claim 94, wherein said audio/video storage and reproduction device comprises a read/write CD ROM drive.*

*98. The audio/video control device as recited in claim 94, wherein said audio/video storage and reproduction device is a memory card port for receiving a memory card, said memory card including means for storing audio and video data thereon, wherein said memory card is connected to a microprocessor upon insertion into said memory port.*

*99. The audio/video control device as recited in claim 94, further comprising means for wireless communication.*

* * * * *